United States Patent
Branson et al.

(10) Patent No.: US 9,703,839 B2
(45) Date of Patent: Jul. 11, 2017

(54) MANAGING STREAMS OF TUPLES

(71) Applicant: International Business Machines Corporation, Armonk, NY (US)

(72) Inventors: Michael J. Branson, Rochester, MN (US); John M. Santosuosso, Rochester, MN (US)

(73) Assignee: International Busines Machines Corporation, Armonk, NY (US)

( * ) Notice: Subject to any disclaimer, the term of this patent is extended or adjusted under 35 U.S.C. 154(b) by 343 days.

(21) Appl. No.: 14/309,999

(22) Filed: Jun. 20, 2014

(65) Prior Publication Data
US 2015/0370837 A1 Dec. 24, 2015

(51) Int. Cl.
G06F 17/00 (2006.01)
G06F 17/30 (2006.01)
H04L 29/06 (2006.01)
H04N 21/00 (2011.01)

(52) U.S. Cl.
CPC .... G06F 17/3053 (2013.01); G06F 17/30312 (2013.01); G06F 17/30864 (2013.01); H04L 65/60 (2013.01); H04L 65/605 (2013.01); H04L 65/80 (2013.01); H04N 21/00 (2013.01)

(58) Field of Classification Search
CPC ......... G06F 12/0246; G06F 2212/7211; G06F 2212/7201; G06F 3/0688; G06F 3/0608
See application file for complete search history.

(56) References Cited

U.S. PATENT DOCUMENTS

| 7,613,848 | B2 | 11/2009 | Amini et al. |
| 7,644,110 | B2 | 1/2010 | Nishizawa et al. |
| 8,095,690 | B2 | 1/2012 | Kashiyama et al. |
| 8,560,526 | B2 | 10/2013 | Santosuosso et al. |
| 2011/0282812 | A1 | 11/2011 | Chandramouli et al. |
| 2012/0218268 | A1 | 8/2012 | Accola et al. |
| 2013/0290489 | A1* | 10/2013 | Branson ................ H04L 47/25 709/219 |
| 2013/0330055 | A1* | 12/2013 | Zimmermann ... G06F 17/30817 386/240 |
| 2014/0280128 | A1 | 9/2014 | Branson et al. |

FOREIGN PATENT DOCUMENTS

| WO | 2007079095 A2 | 7/2007 |
| WO | 2013155234 A1 | 10/2013 |

OTHER PUBLICATIONS

Ballard et al., "IBM InfoSphere Streams Harnessing Data in Motion", Sep. 2010, 360 Pages, IBM Redbooks. http://www.redbooks.ibm.com/abstracts/sg247865.html.

(Continued)

Primary Examiner — Truong Vo
(74) Attorney, Agent, or Firm — Jay Wahlquist

(57) ABSTRACT

A plurality of streams of tuples is received by processing elements operating on computer processors, the processing element having one or more stream operators. A first stream of tuples is processed at a receiving stream operator. A streaming condition is then identified. The streaming condition is determined to be satisfied and an alternate stream of tuples is processed at the receiving stream operator.

14 Claims, 7 Drawing Sheets

(56) References Cited

OTHER PUBLICATIONS

Fernandez-Moctezuma et al., "Towards Execution Guarantees for Stream Queries", 2010 IEEE International Symposium on Parallel and Distributed Processing, Workshops and PhD Forum (IPDPSW), pp. 1-10, Apr. 2010, (INSPEC Accession No. 11309776). DOI: 10.1109/IPDPSW.2010.5470850.
IBM, "Improved handling of over-load conditions in a networked system through efficient port-space usage", IP.com Prior Art Database Technical Disclosure, IP.com No. IPCOM000012910D, Published Jun. 9, 2003. http://ip.com/IPCOM/000012910.
Internet Society, "General Switch Management Protocol (GSMP) V3 (RFC3292)", IP.com Prior Art Database Technical Disclosure, IP.com No. IPCOM000008397D, Original Publication Jun. 1, 2002, Online Publication Jun. 12, 2002, © The Internet Society 2002. http://ip.com/IPCOM/000008397.
Tucker et al., "Exploiting Punctuation Semantics in Continuous Data Streams", IEEE Transactions on Knowledge and Data Engineering, vol. 15, No. 3, May/Jun. 2013, pp. 1-14, © 2003 IEEE, (Received May 15, 2002, Revised Nov. 15, 2002, Accepted Dec. 4, 2002), IEEE Computer Society. DOI: 10.1109/TKDE.2003.1198390.
Branson et al., "Managing Streams of Tuples", U.S. Appl. No. 14/466,184, filed Aug. 22, 2014.
List of IBM Patents or Patent Applications Treated as Related.

\* cited by examiner

MANAGING STREAMS OF TUPLES

BACKGROUND

The present disclosure relates to stream computing and more specifically, to managing streams of tuples.

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

According to embodiments of the present disclosure, a method is disclosed for processing a plurality of streams of tuples. In various embodiments, the method may include receiving the plurality of streams of tuples to be processed by a plurality of processing elements operating on one or more computer processors, each processing element having one or more stream operators. The method may also include processing a first stream from the plurality of streams of tuples at a receiving stream operator from the one or more stream operators. In addition, the method may include identifying a streaming condition. Also, the method may include determining that the streaming condition is satisfied. Furthermore, the method may include processing an alternate stream from the plurality of streams of tuples at the receiving stream operator in response to the streaming condition being satisfied.

According to embodiments of the present disclosure, a system is disclosed for processing a plurality of streams of tuples. In various embodiments, the system may include one or more processing elements having one or more stream operators configured to receive the plurality of streams of tuples. The stream operators may also be further configured to process a first stream from the plurality of stream of tuples. In addition, the stream operators may be further configured to identify a streaming condition. Also, the stream operators may be further configured to determine that the streaming condition is satisfied. Furthermore, the stream operators may be further configured to process an alternate stream from the plurality of streams of tuples in response to the streaming condition being satisfied.

According to embodiments of the present disclosure, a computer program product is disclosed for processing a plurality streams of tuples. In various embodiments, the computer program product may receive the plurality of streams of tuples to be processed by a plurality of processing elements operating on one or more computer processors, each processing element having one or more stream operators. The computer program product may also process a first stream from the plurality of streams of tuples at a receiving stream operator from the one or more stream operators. In addition, the computer program product may identify a streaming condition. Also, the computer program product may determine that the streaming condition is satisfied. Furthermore, the computer program product may process an alternate stream from the plurality of streams of tuples at the receiving stream operator in response to the streaming condition being satisfied.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
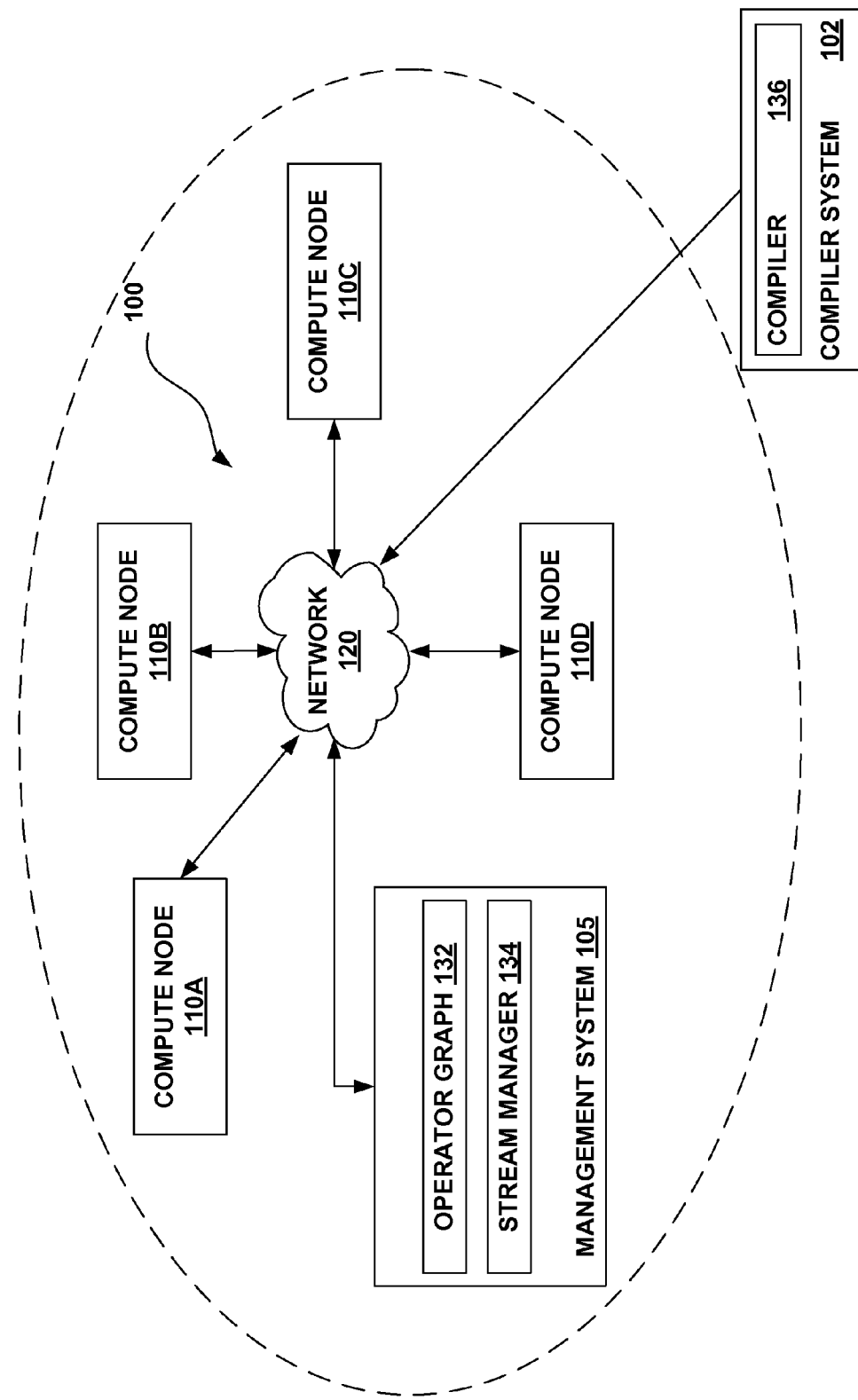
FIG. 1 illustrates a computing infrastructure that may be configured to execute a stream-based computing application, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to stream computing, more particular aspects relate to managing streams of tuples. While the present disclosure is not necessarily limited to such applications, various aspects of the disclosure may be appreciated through a discussion of various examples using this context.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

Various embodiments of the present disclosure are directed toward managing streams of tuples. A stream computing application includes processing elements comprised of stream operators. Stream operators are connected to one another such that data flows from one stream operator to the next (e.g., over a TCP/IP socket). Processing elements and stream operators attach to each other by identifying a stream of data they would like to receive. A stream operator can receive multiple streams of data. When this occurs, data is said to come into the stream operator on multiple ports. Steam operators can also receive one stream of data at one port, disconnect the stream, and receive a different stream of data at the same port. In either case, it may be preferable to process one stream of data over another. There are several streaming conditions that may make it preferable to process one stream of data over another. For instance, the streaming condition can be based on the rate at which data is received by a stream operator, the hardware from which the receiving stream operator is deployed, the number of problems encountered while processing a stream of tuples, the amount of "new" or "unique" data in a stream of tuples, or a hierarchical ranking of the stream of tuples. Therefore, several embodiments are described herein that override data streaming into a stream operator based off of real time streaming conditions.

In streaming applications, scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

An operator graph can have (be an execution path for) a plurality of stream operators to process streaming data. The streams of data comprising the streaming data can flow from multiple source operators and can be received by multiple receiving operators. In certain embodiments, one source operator can send a stream of data that is equivalent to a stream of data sent from a second operator. For example, source operator 1 can count the number of cars that pass through a checkpoint during each hour of the day and calculate the total. In addition, source operator 2 can also count the number of cars that pass through the same checkpoint during each hour of the day and calculate the total. As a result, source 1 and source 2 should output the same total each hour. Particular embodiments of the present disclosure can allow receiving operators to alternate between receiving a streams of data from different source operators that send the same or similar data.

Processing elements are triggered to execute when a stream of data arrives at a port. Data flows in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

When a stream operator receives a tuple, it may perform operations, such as analysis logic, which may change the tuple by adding or subtracting attributes, or updating the values of existing attributes within the tuple. When the analysis logic is complete, a new tuple is then sent to the next stream operator. Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second.

Tuples stream from one stream operator to another along communication paths. Communication paths can be a critical resource in a stream computing application. Efficient use of communication path bandwidth can speed up processing. According to various embodiments, an alternate stream of tuples can be received and processed by a stream operator instead of a first stream of tuples that is currently being received and processed by the stream operator. This may increase the quality of the output of the stream operators, the processing elements, and the stream computing application. Accordingly, various embodiments are directed towards replacing a stream of tuples with an alternate stream of tuples that satisfies a streaming condition or multiple streaming conditions.

Turning now to the figures, FIG. 1 illustrates a computing infrastructure 100 that may be configured to execute a stream-based computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

Figure 3:
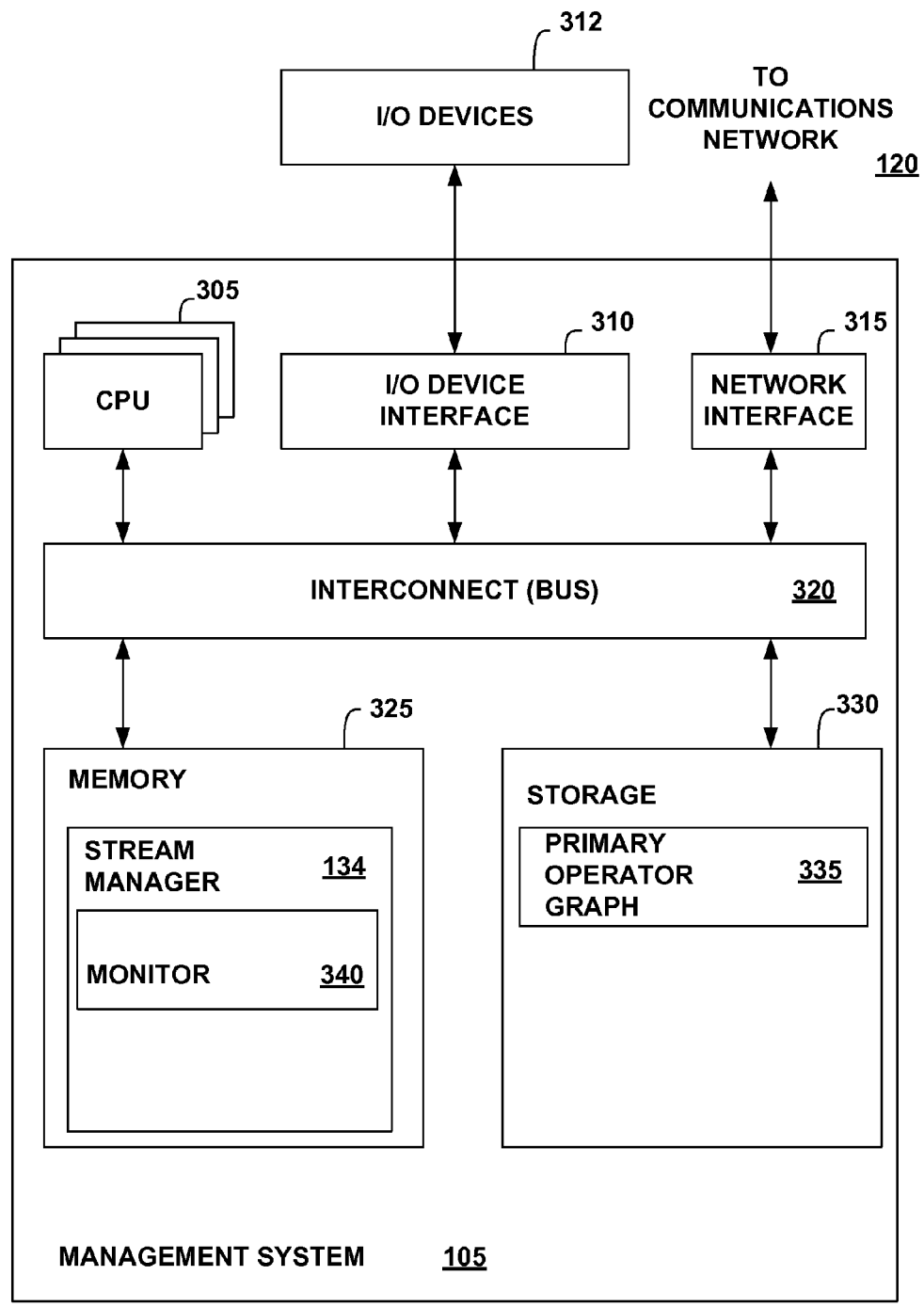
FIG. 3 is a more detailed view of the management system 105 of FIG. 1 according to some embodiments.

The management system 105 can control the management of the compute nodes 110A-110D (discussed further on FIG. 3). The management system 105 can have an operator graph 132 with one or more stream operators and a stream manager 134 to control the management of streams of tuples in the operator graph 132.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
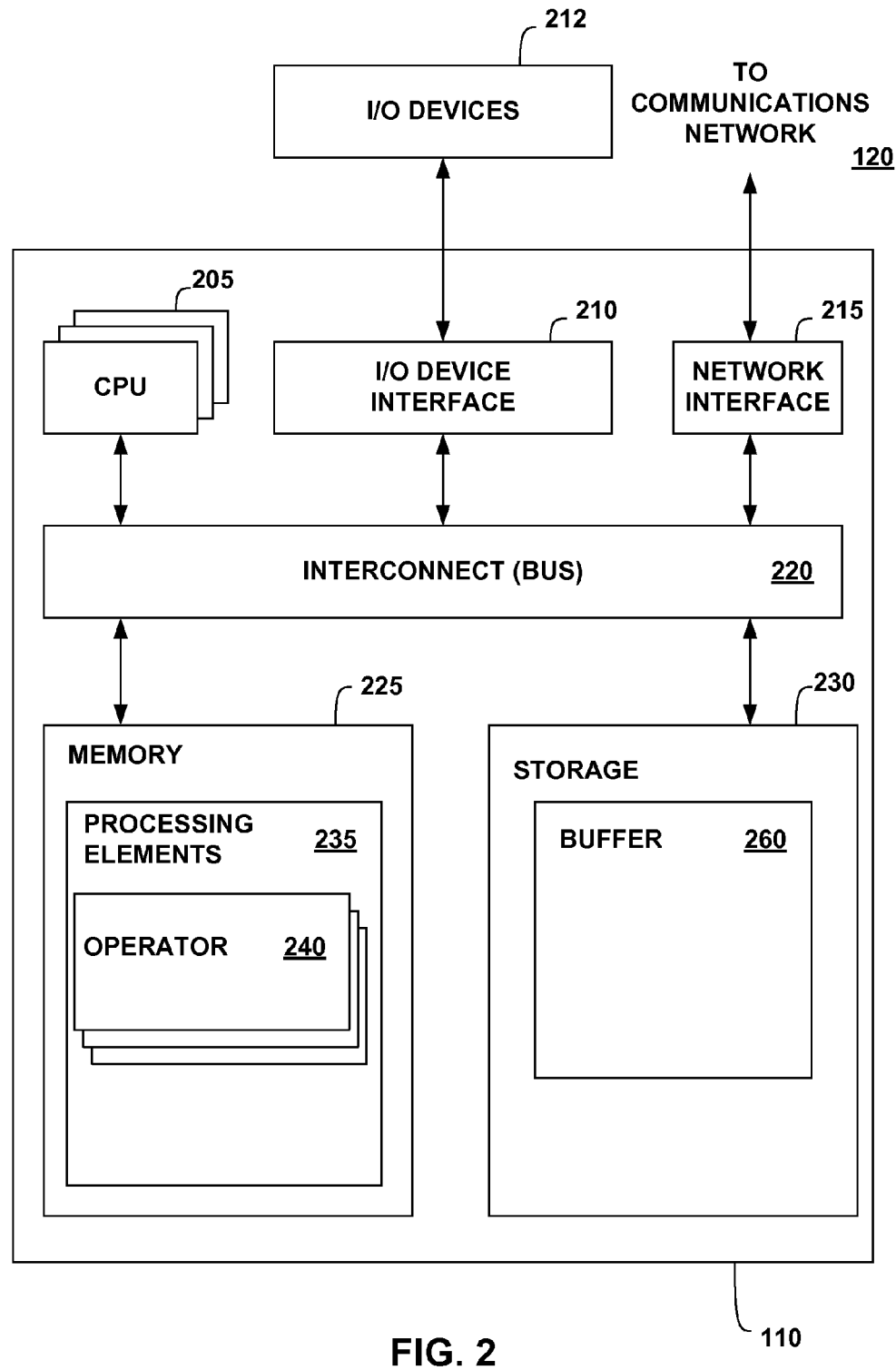
FIG. 2 is a more detailed view of a compute node 110, which may be the same as one of the compute nodes 110A-110D of FIG. 1, according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A streams application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 305, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing. The stream manager 134 may contain a monitor 340. The monitor 340 may examine the operator graph 132 to determine the amount of data being buffered on a stream operator. The monitor 340 may be a part of the stream manager 134 or act independently.

Figure 4:
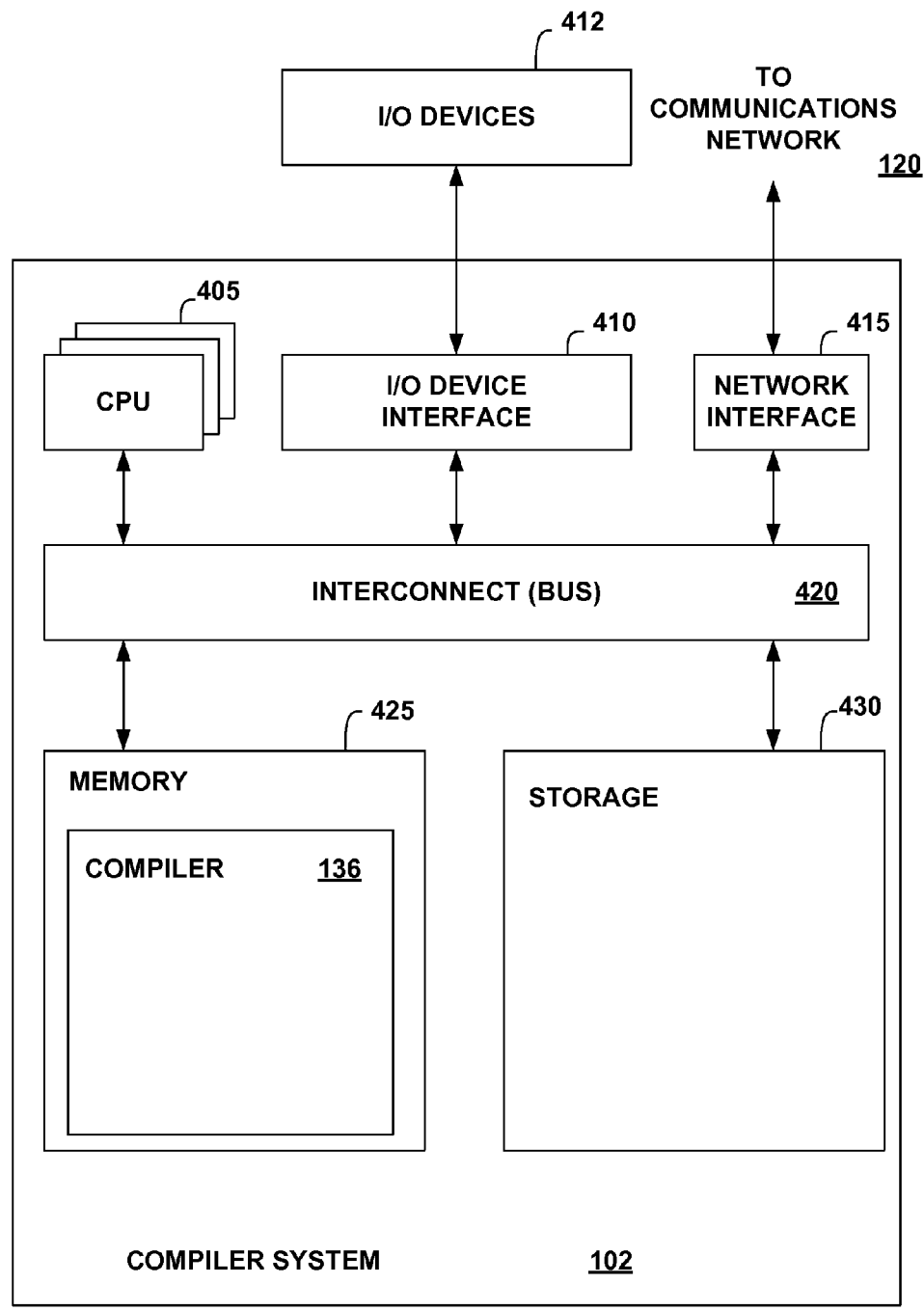
FIG. 4 is a more detailed view of the compiler system 102 of FIG. 1 according to some embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the streaming application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
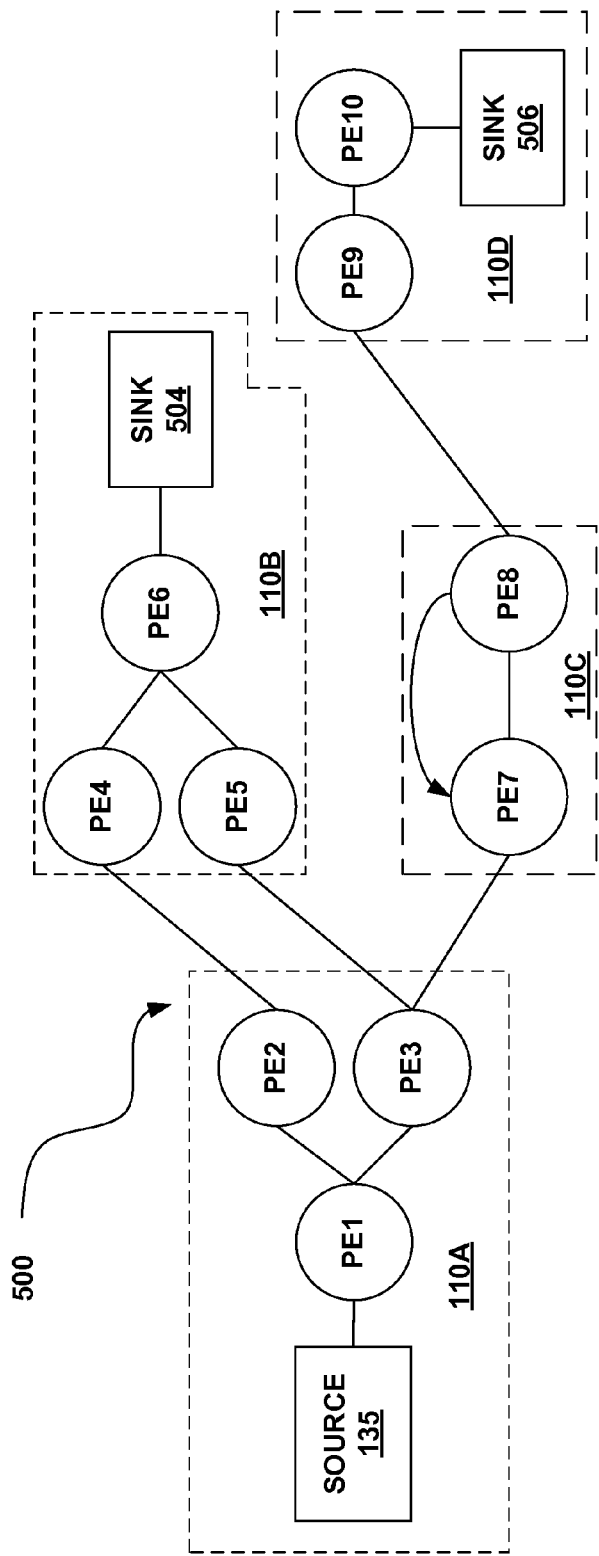
FIG. 5 illustrates an exemplary operator graph for a stream computing application beginning from one or more sources through to one or more sinks, according to some embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, this flow from source to sink may include a plurality of streams, beginning with a stream that processing element PE1 receives from source 135 to streams respectively received by processing elements PE6, PE8, and PE10. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from an input stream as well as output tuples to another processing element as an output stream (except for a sink—where a stream terminates, or a source—where a stream begins).

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Data that flows to PE2 is processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

The tuple received by a particular processing element 235 (FIG. 2) is generally not considered to be the same tuple that is output downstream. Typically, the output tuple is changed in some way. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element. However, to simplify the present description and the claims, an output tuple that has the same data attributes as a corresponding input tuple may be referred to herein as the same tuple.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
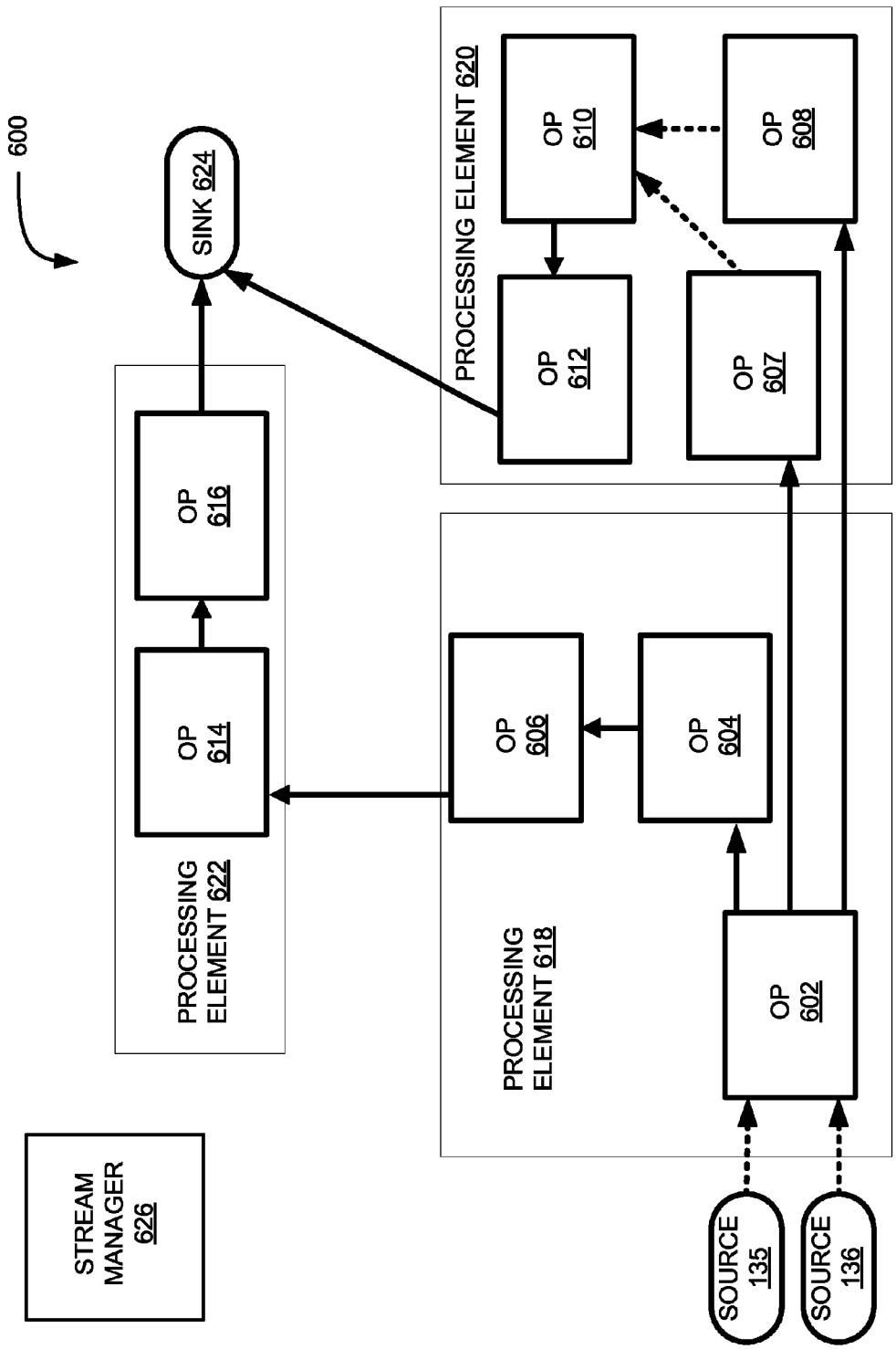
FIG. 6 depicts an operator graph for managing streams of tuples, consistent with embodiments of the present disclosure.

FIG. 6 depicts an operator graph 600 for managing streams of tuples, consistent with embodiments of the present disclosure. As shown, the stream computing system 600 can include sources 135, 136, processing elements 618, 620, 622, sink 624, and a steam manager 626. Processing element 618 can include stream operators 602, 604, 606, processing element 620 can include stream operators 607, 608, 610, 612, and processing element 622 can include stream operators 614 and 616.

The operator graph 600 can begin from source 135 or source 136 through to the sink 624. In FIG. 6, as shown, there are solid arrow lines and dashed arrow lines. The solid arrow lines represent a constant stream of tuples. However, the dashed arrow lines from sources 135 and 136 and stream operators 607 and 608 represent streams of tuples that a receiving operator can alternate between receiving and processing. Various embodiments of the current disclosure are directed towards a stream computing system that receives a stream of tuples from a source (e.g., source 135). The stream of tuples is then processed by a receiving stream operator. The receiving stream operator can then receive a signal to evaluate the stream of tuples. A streaming condition can be identified and in certain embodiments, the receiving operator can determine that an alternate stream from a source (e.g., source 136) satisfies the streaming condition. In other embodiments, the stream manager, e.g. stream manager 626, can determine that an alternate stream of tuples satisfies the streaming condition. The alternate stream can then be processed by the receiving operator.

In certain embodiments, a stream of tuples can be received by stream operator 602 from the source 135 or source 136. As illustrated, the stream of tuples can be processed and a first stream of tuples can be sent to stream operator 604, a second stream of tuples can be sent to stream operator 607, and a third stream of tuples can be sent to stream operator 608. The first stream of tuples can be processed by stream operators 604, 606, 614, 616 to sink 624. The second stream can be processed by stream operator 607 and the third stream can be processed by stream operator 608. Stream operator 610 can then receive and process the second stream from stream operator 607 and send the second stream to stream operator 612 where the second stream is processed by stream operator 612 and sent to sink 624. Alternatively, stream operator 610 can receive and process the third stream from stream operator 608 and send the third stream to stream operator 612 where the third stream is processed by stream operator 612 and sent to sink 624.

As shown, stream operator 602 can receive a stream of tuples from either stream source 135 or 136. As stated herein, stream operators attach to each other by identifying a stream of tuples they would like to receive. For stream operators to attach, a stream operator declares the stream needed as an input. In an embodiment, the stream operator can declare the stream explicitly by name. In another embodiment, the stream operator can declare properties needed as an input. These properties may be present in some streams and not present in another. Therefore, a stream that has the properties can be chosen dynamically by the stream operator.

Multiple streams can be identified and multiple streams can have properties that match the declared properties. Therefore, an operator can receive multiple streams of tuples. When this occurs, streams of tuples are said to come into the stream operator on multiple input ports. However, depending upon the application, a stream of tuples coming in on a given input port can be ignored. In an embodiment, a first stream of tuples can be connected and received at a first input port of a stream operator and a second stream of tuples can be connected and received at a second input port. In response to determining that a streaming condition is not met, the stream operator can process only the first stream of tuples, but still receive the second stream of tuples on the second input port and discard or otherwise not process the second stream of tuples. In another embodiment, the stream operator can have the first stream of tuples connected to the first input port and process the first stream of tuples. In response to determining that a streaming condition is met, the stream operator can disconnect the first stream of tuples and connect the second stream of tuples to the first input port. The stream operator can then receive and process the second stream of tuples.

As stated, the stream of tuples that the stream operator receives and processes can be in response to a streaming condition being met. In an embodiment, the streaming condition can be the rate at which data is received by a stream operator. The rate of the stream of tuples processed can either be higher or lower, i.e. different, than the rate of the stream of tuples not processed. The streams of tuples can have the same type of data and the stream of tuples processed can be chosen based on that stream having data that is correct or more reliable than another stream of tuples. There can be multiple ways to determine whether one stream is correct or more reliable than another stream. For instance, reliability can be based on historical data, a present "normal" data rate range, a source, e.g. a stream operator or a processing element, that is known to be more reliable, a source that is on a more reliable infrastructure, e.g. a more reliable server, or a source that is less likely to be hacked or otherwise compromised.

For example, sources 135 and 136 both monitor the amount of vehicles that travel past two points on a highway each day. Therefore, sources 135 and 136 provide two sets of the same type of data. Assume that stream operator 602 currently only processes a stream of tuples from source 135. However, periodically, stream operator 602 or stream manager 626 can determine the rate at which the stream of tuples is received from source 135 and the rate at which the stream of tuples is received from source 136. In this embodiment, stream operator 602 can process the stream of tuples that is received at a higher data rate. Therefore, stream operator 602 can determine that the stream of tuples sent from source 136 has a higher data rate than the stream of tuples sent from source 135. Stream operator 602 can then disregard the stream of tuples sent from source 135 and process the stream of tuples sent from source 136. Furthermore, at a later time, stream operator 602 or stream manager 626 can check again to see if the stream of tuples sent from source 136 still has a higher data rate than the stream of tuples sent from source 135. If it does, stream operator 602 can continue to process the stream of tuples from source 136. However, if the stream of tuples sent from source 135 has a higher data rate, stream operator 602 can disregard the stream of tuples sent from source 136 and instead process the stream of tuples sent from source 135.

In various embodiments, it may be determined whether a streaming condition is met when a stream operator receives a signal to evaluate alternate streams of tuples. In an embodiment, the stream operator can determine whether a streaming condition is met in response to receiving the signal. In other embodiments, the stream manager 626 can determine whether a streaming condition is met in response to the stream operator receiving the signal.

In certain embodiments, the signal can be in the form of a punctuation within the stream of tuples that is being received by stream operator. A punctuation is a control signal (marker) sent by an upstream stream operator that appears interleaved with the tuples in a stream. For example two kinds of punctuation are: window punctuations and final punctuations. A window punctuation separates groups of consecutive tuples on a stream to create window boundaries. For example, each time stream operator 610 receives a window punctuation, it identifies a streaming condition and determines whether an alternate stream satisfies the streaming condition. Various embodiments can use other suitable punctuations.

In other embodiments, the signal to evaluate alternate streams of tuples can be an out of band signal. The out of band signal can come from a number of sources such as the stream manager 626, another application, or an external system. An out of band signal can be independent from the stream of tuples and can be delivered to a stream operator on a control port.

In another embodiment, the streaming condition can be based on the hardware from which the source is deployed. This can include physical location, IP address or machine names. For example, referring again to our highway example, source 135 can be deployed on a sensor that is newer and therefore, more reliable than the sensor from which source 136 is deployed. However, at certain times during a day, the sensor from which source 135 is deployed is turned off because of lack of use and to conserve energy. As a result, if the sensor from which source 135 is deployed is turned off, stream operator 602 can receive a stream of tuples from source 136. However, if the sensor from which source 135 is deployed is turned on, stream operator 602 can receive a stream of tuples from source 135.

In another embodiment the streaming condition can be a threshold of exceptions output by stream operator 602, i.e. the number of exceptions output by stream operator 602 outside the threshold will determine whether stream operator 602 processes an alternate stream of tuples. The number of exceptions output by stream operator 602 can be based on the number of problems encountered while processing a stream of tuples. For example, referring back to the highway example, source 135 can experience a number of problems, such as a problem with a sensor, a problem with a network connection to the sensor, or there can be a faulty change to the logic that is being applied to the stream of tuples before it gets to the application. In this example, stream operator 602 may output an exception each time it encounters a problem processing the stream of tuples from source 135. Therefore, if source 135 is experiencing a problem, stream operator 602 may experience problems processing the stream of tuples sent from source 135. Thus, if stream operator 602 outputs an amount of exceptions that meets or exceeds a threshold value and stream operator 602 does not meet or exceed that threshold value when processing a stream of tuples sent from source 136, stream operator 602 can then process the stream of tuples sent from source 136.

In another case, source 135 may not be sending enough "unique" or "interesting" data to stream operator 602. In this case, the streaming condition is based on the amount of "unique" data provided by a stream of tuples. Stream operator 602 can be configured to determine if data is "unique" based upon a subset of the attributes in a stream of tuples. For example, individuals can be given parole before they serve their entire prison sentence. There is a likelihood that individuals will commit a crime that violates their parole and be sent back to prison. It has been found that individuals 50 years of age or older are less likely to violate their parole than individuals under the age of 50. Therefore, a streaming application only wants to process streams that have individuals under the age of 50, to find out the crimes these individuals committed for which they were sent back to prison. As a result, the "unique" attribute that stream operator 602 will look for to determine which stream to process is the age of the individual. In this case, stream operator 602 looks at the attribute and determines that source 135 is sending a stream of tuples that have profiles of individuals 50 and older. Stream operator 602 then looks at the attribute and determines that source 136 is sending a stream of tuples that have profiles of individuals under the age of 50. Therefore, stream operator 602 can process the stream of tuples sent from source 136.

In another embodiment, the streaming condition can be a hierarchical ranking of the streams. Therefore, stream operator 602 can be configured with a ranking of streams of tuples. The ranking can be based on a number of different criteria, such as the hardware from which sources are deployed, similar to our previous example. In this example, stream operator 602 can be configured to rank the stream of tuples sent from source 135 above the stream of tuples sent from source 136 because the sensor from which source 135 is deployed is more reliable than the sensor from which source 136 is deployed. Therefore, if the stream of tuples is available to be received from source 135, then stream operator 602 will process the stream of tuples from source 135. However, if the stream of tuples is not available to be received from source 135, then the stream operator 602 will process the stream of tuples from source 136.

The preceding examples are simplified examples of a stream of tuples satisfying a streaming condition and overriding another stream of tuples. A real world example can involve millions of streams of tuples per second passing through multiple stream operators and processing elements along multiple execution paths. Furthermore, the above examples have been given with respect to alternating between sources 135 and 136. However, stream operators that send two or more streams of tuples that provide the same data could just have easily been used (e.g., stream operators 607 and 608). There are also other streaming conditions or several streaming conditions used to determine which stream of tuples a stream operator will receive and process. For instance, a first streaming condition can be based on a data rate threshold value and a second streaming condition can be based on a threshold value of exceptions output by a receiving stream operator while processing a stream of tuples. The stream operator can determine that two streams of tuples meet the data rate threshold value. However, the streaming operator outputs a number of exceptions that meets or exceeds a threshold value when processing a first stream of tuples and does not output a number of exceptions that meets or exceeds the threshold value when processing an alternate stream of tuples. Therefore, the alternate stream of tuples satisfies both streaming conditions while the first stream of tuples does not and the stream operator can process the second stream of tuples.

Figure 7:
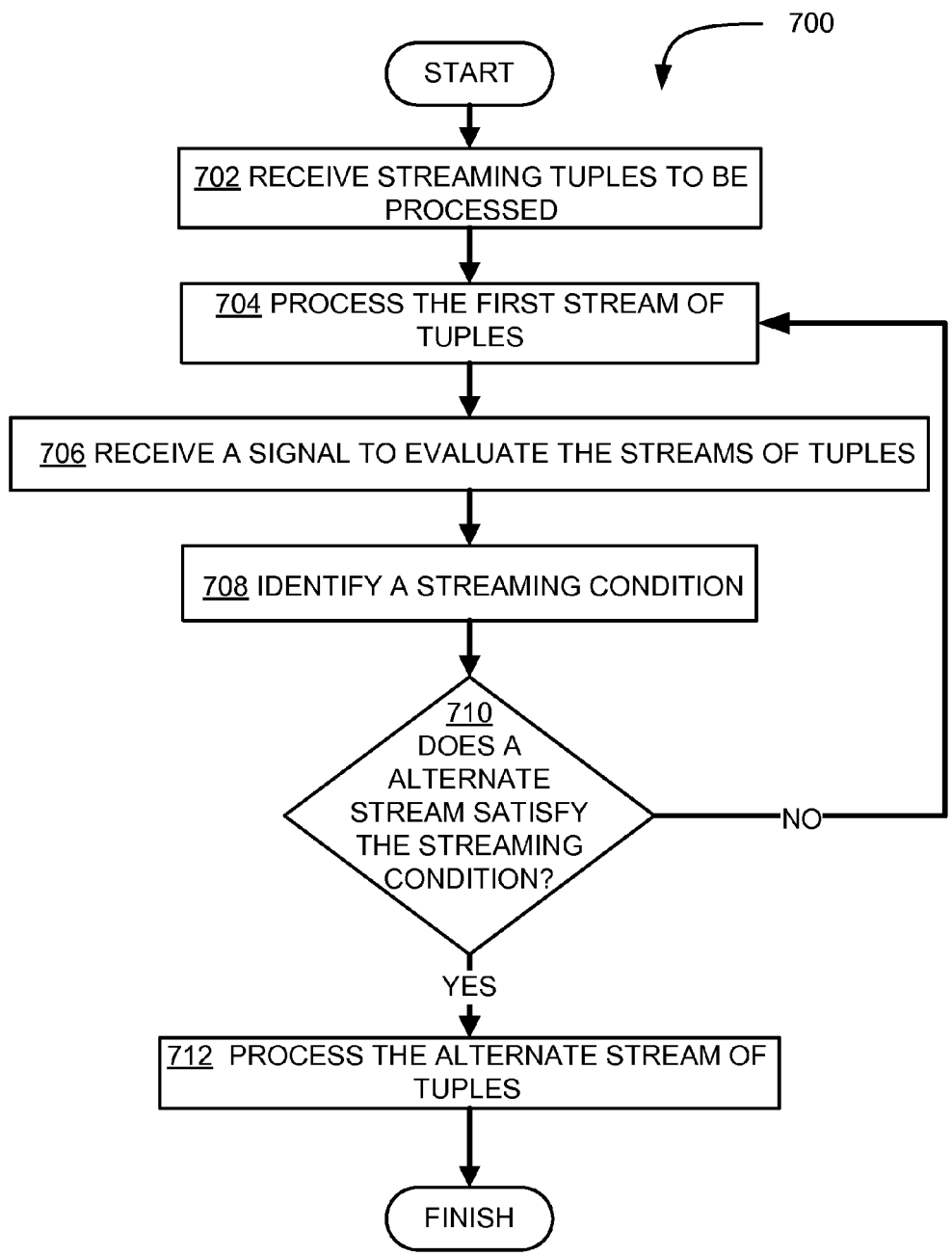
FIG. 7 depicts a method for managing streams of tuples, consistent with embodiments of the present disclosure.

FIG. 7 depicts a method 700 for managing streams of tuples, consistent with embodiments of the present disclosure. In operation 702, streams of tuples are received by multiple stream operators operating on multiple processing elements operating on one or more computer processors. As stated herein, stream operators attach to each other by identifying a stream of tuples they would like to receive. When a stream operator wants to receive a stream of tuples, it can name the stream of tuples. By doing so, the stream operators can attach to one another and the stream of tuples can connect to an input port of the stream operator that wants to receive the stream of tuples.

In operation 704, a first stream of tuples is processed. In operation 706, the stream operator receives a signal to evaluate the streams of tuples. In one embodiment, the signal can be in the form of a punctuation interleaved with the first stream of tuples that is being processed by stream operator. In another embodiment, the signal can be an out of band signal independent from the stream of tuples.

In operation 708, a streaming condition is identified. There can be numerous streaming conditions. For instance, the streaming condition can be based on the rate at which data is received by a stream operator, the hardware from which the receiving stream operator is deployed, the number of problems encountered while processing a stream of tuples, the amount of "new" or "unique" data in a stream of tuples, or a hierarchical ranking of the streams of tuples.

In operation 710, it is determined whether the streaming condition is satisfied. For example, a stream operator receiving a first stream of tuples and an alternate stream of tuples determines that both streams meet a data rate threshold value. However, when processing the alternate stream of tuples, the streaming operator outputs a number of exceptions representing problems encountered processing the stream. The problems encountered can signify a possible problem with the data of the alternate stream. Furthermore, the number of exceptions meets or exceeds a threshold value. When processing the first stream of tuples, the stream operator does not encounter as many problems processing the stream and does not output a number of exceptions that meets or exceeds the threshold value. Therefore, the first stream of tuples satisfies both streaming conditions while the alternate stream of tuples does not. In this case, the first stream of tuples will continue to be processed by the stream operator, in operation 704, until the stream operator receives another signal, in operation 706, to evaluate the streams of tuples again.

In another example, the number of exceptions output by the stream operator meets or exceeds the threshold value when processing the first stream. However, the number of exceptions output by the stream operator does not meet or exceed the threshold value when processing the alternate stream. Therefore, in operation 712, the alternate stream of tuples is processed by the stream operator.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for processing a plurality of streams of tuples, comprising:

one or more computer processors; and
one or more processing elements operating on the one or more computer processors, each of the one or more processing elements comprising one or more stream operators, wherein the one or more stream operators are configured to:
receive the plurality of streams of tuples;
process, by a first stream operator included in the one or more stream operators, a first stream among the plurality of streams of tuples received by the one or more stream operators, the first stream operator receiving the first stream;
identify a streaming condition indicating that processing an alternate stream, included in the plurality of streams of tuples received by the one or more stream operators, is preferable to processing the first stream;
determine that the streaming condition is satisfied based, at least in part, on at least one of the one or more stream operators generating exceptions outside of a threshold and the alternate stream satisfying a uniqueness criterion, wherein the exceptions are associated with problems encountered in processing the first stream, and wherein the uniqueness criterion is associated with at least one attribute of the alternate stream; and
in response to the streaming condition being satisfied, discontinue processing, by the first stream operator, the first stream and process, by the first stream operator, the alternate stream.

2. The system of claim 1, wherein the one or more processing elements are configured to receive a signal to process the plurality of streams of tuples.

3. The system of claim 2, wherein the signal is a control signal interleaved with the first stream.

4. The system of claim 2, wherein the signal is an out of band signal independent from the first stream.

5. The system of claim 1, wherein the one or more stream operators are further configured to determine that the streaming condition is satisfied based at least in part on the alternate stream having a different rate of data than the first stream.

6. The system of claim 1, wherein the one or more stream operators are further configured to determine that the streaming condition is satisfied based at least in part on the alternate stream having a higher ranking than the first stream on a ranking of streams.

7. The system of claim 1, wherein the one or more stream operators are further configured to determine that the streaming condition is satisfied based on hardware from which a source stream operator, among the one or more stream operators, that sends the alternate stream, is deployed.

8. A computer program product for processing a plurality streams of tuples, the computer program product comprising a computer readable storage medium having program code embodied therewith, the computer readable storage medium comprising a non-transitory tangible medium, the program code comprising computer readable instructions executable by a plurality of processors to cause the plurality of processors to:
receive the plurality of streams of tuples;
process, by at least one first processor, among the plurality of processors, a first stream among the plurality of streams of tuples received by the plurality of processors, the least one first processor receiving the first stream;
identify a streaming condition indicating that processing an alternate stream, included in the plurality of streams of tuples received by the plurality of processors, is preferable to processing the first stream;

determine that the streaming condition is satisfied based, at least in part, on at least one second processor, among the plurality of processors, generating exceptions outside of a threshold and the alternate stream satisfying a uniqueness criterion, wherein the exceptions are associated with problems encountered in processing the first stream, and wherein the uniqueness criterion is associated with at least one attribute of the alternate stream; and in response to the streaming condition being satisfied, discontinue processing, by the at least one first processor, the first stream and process, by the at least one first processor, the alternate stream.

9. The computer program product of claim 8, wherein the computer readable instructions further comprise instructions executable by the plurality of processors to cause at least one third processor, among the plurality of processors to receive a signal to process the plurality of streams of tuples.

10. The computer program product of claim 8, wherein the signal is a control signal interleaved with the first stream.

11. The computer program product of claim 8, wherein the signal is an out of band signal independent from the first stream.

12. The computer program product of claim 8, wherein the computer readable instructions further comprise instructions executable by the plurality of processors to cause at least one third processor, among the plurality of processors, to determine that the streaming condition is satisfied based at least in part on the alternate stream having a different rate of data than the first stream.

13. The computer program product of claim 8, wherein the computer readable instructions further comprise instructions executable by the plurality of processors to cause at least one third processor, among the plurality of processors, to determine that the streaming condition is satisfied based at least in part on the alternate stream having a higher ranking than the first stream on a ranking of streams.

14. The computer program product of claim 8, wherein the computer readable instructions further comprise instructions executable by the plurality of processors to cause at least one third processor, among the plurality of processors, to determine that the streaming condition is satisfied based at least in part on hardware from which a source processor, among the plurality of processors, that sends the alternate stream, is deployed.

* * * * *